(12) United States Patent
Shih

(10) Patent No.: US 10,955,645 B2
(45) Date of Patent: Mar. 23, 2021

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventor: Po-Yuan Shih, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 233 days.

(21) Appl. No.: 16/383,808

(22) Filed: Apr. 15, 2019

(65) Prior Publication Data

US 2020/0096746 A1 Mar. 26, 2020

(30) Foreign Application Priority Data

Sep. 26, 2018 (CN) .......................... 201811123599.2

(51) Int. Cl.
*G02B 13/04* (2006.01)
*G02B 13/18* (2006.01)
*G02B 9/64* (2006.01)
(52) U.S. Cl.
CPC .............. *G02B 13/04* (2013.01); *G02B 9/64* (2013.01); *G02B 13/18* (2013.01)
(58) Field of Classification Search
CPC .... G02B 13/04; G02B 13/18; G02B 15/1465; G02B 9/64
See application file for complete search history.

(56) References Cited

U.S. PATENT DOCUMENTS

2008/0068726 A1* 3/2008 Horneber ............... G02B 13/04
359/680

FOREIGN PATENT DOCUMENTS

JP 2017142297 A 8/2017

\* cited by examiner

*Primary Examiner* — Joseph P Martinez
*Assistant Examiner* — Vipin Patel
(74) *Attorney, Agent, or Firm* — McClure, Qualey & Rodack, LLP

(57) ABSTRACT

A wide-angle lens assembly includes a first lens, a second lens, a third lens, a fourth lens, a fifth lens, a sixth lens, a seventh lens, an eighth lens, a ninth lens and a tenth lens arranged in order from an object side to an image side along an optical axis. The first lens has negative refractive power and includes a convex surface facing the object side and a concave surface facing the image side. The second lens has negative refractive power. The third lens has refractive power and includes a convex surface facing the image side. The fourth lens has positive refractive power and includes a convex surface facing the object side. The fifth lens has refractive power. The sixth lens has refractive power and includes a concave surface facing the object side. The seventh lens has positive refractive power. The eighth lens is a biconvex lens with positive refractive power. The ninth lens has negative refractive power. The tenth lens has refractive power and includes a convex surface facing the image side.

20 Claims, 12 Drawing Sheets

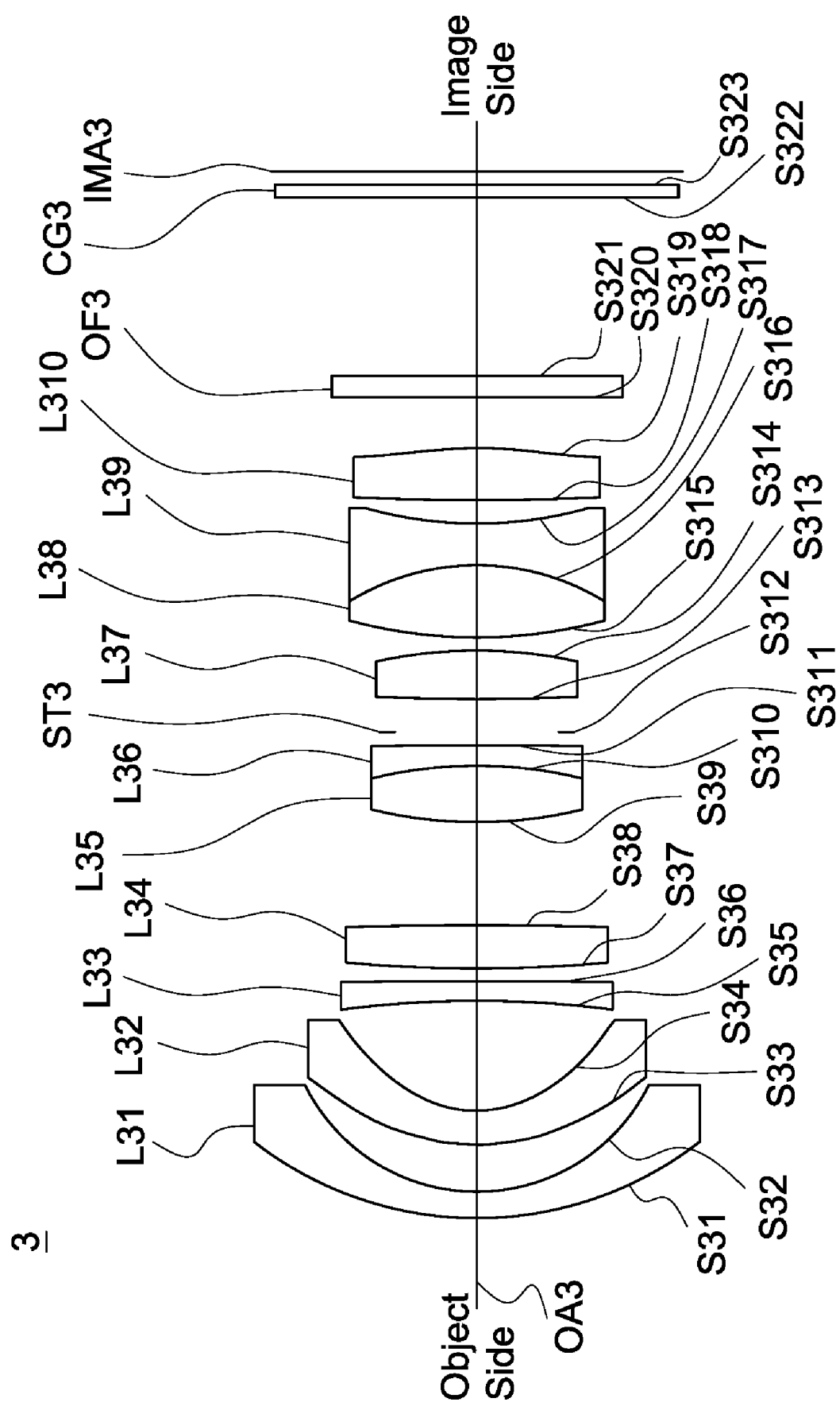

WIDE-ANGLE LENS ASSEMBLY

BACKGROUND OF THE INVENTION

Field of the Invention

The present disclosure is related to a wide-angle lens assembly.

Description of the Related Art

The development of wide-angle lens assemblies nowadays is tending toward a wide-angle lens assembly not only having a large view angle but also having less distortion and a high brightness according to a variety of application requirements. The wide-angle lens assemblies well known in the art have not been able to satisfy such a need. Therefore, a wide-angle lens assembly with another configuration having a large view angle, less distortion and a high brightness is required.

BRIEF SUMMARY OF THE INVENTION

For this reason, the present disclosure provides a wide-angle lens assembly that has a short total length, a wide view angle, a high brightness and less distortion and also has great optical performance.

A wide-angle lens assembly in the present disclosure includes a first lens, a second lens, a third lens, a fourth lens, a fifth lens, a sixth lens, a seventh lens, an eighth lens, a ninth lens and a tenth lens. The first lens has negative refractive power and includes a convex surface facing an object side and a concave surface facing an image side. The second lens has negative refractive power. The third lens has refractive power and includes a convex surface facing the image side. The fourth lens has positive refractive power and includes a convex surface facing the object side. The fifth lens has refractive power. The sixth lens has refractive power and includes a concave surface facing the object side. The seventh lens has positive refractive power. The eighth lens is a biconvex lens with positive refractive power. The ninth lens has negative refractive power. The tenth lens has refractive power and includes a convex surface facing the image side. The first to tenth lenses are arranged in order from the object side to the image side along an optical axis.

Another wide-angle lens assembly in the present disclosure includes a first lens, a second lens, a third lens, a fourth lens, a fifth lens, a sixth lens, a seventh lens, an eighth lens, a ninth lens and a tenth lens. The first lens has negative refractive power and includes a convex surface facing an object side and a concave surface facing an image side. The second lens has negative refractive power. The third lens has refractive power and includes a convex surface facing the image side. The fourth lens has positive refractive power and includes a convex surface facing the object side. The fifth lens has refractive power. The sixth lens has refractive power and includes a concave surface facing the object side. The seventh lens has positive refractive power. The eighth lens is a biconvex lens with positive refractive power. The ninth lens has negative refractive power and includes a concave surface facing the object side. The tenth lens has refractive power and includes a convex surface facing the image side. The first to tenth lenses are arranged in order from the object side to the image side along an optical axis.

In the above wide-angle lens assembly, the sixth lens has negative refractive power and further includes a convex surface facing the image side.

In the above wide-angle lens assembly, the sixth lens has negative refractive power and further includes a concave surface facing the image side.

In the above wide-angle lens assembly, the third lens has negative refractive power, the fourth lens further includes a convex surface facing the image side, the fifth lens is a biconvex lens with positive refractive power, the ninth lens includes a concave surface facing the image side, and the tenth lens has positive refractive power and further includes a convex surface facing the object side.

In the above wide-angle lens assembly, the fifth lens and the sixth lens form a doublet lens.

In the above wide-angle lens assembly, the eighth lens and the ninth lens form a doublet lens.

In the above wide-angle lens assembly, the wide-angle lens assembly satisfies the following condition: $-20 \leq f_3/f \leq -2$, wherein f3 is the focal length of the third lens, and f is the effective focal length of the wide-angle lens assembly.

In the above wide-angle lens assembly, the wide-angle lens assembly satisfies the following condition: $-10 \leq f_6/f \leq 20$, wherein f6 is the focal length of the sixth lens, and f is the effective focal length of the wide-angle lens assembly.

In the above wide-angle lens assembly, the wide-angle lens assembly satisfies the following condition: $2 \leq f_{56}/f \leq 30$, wherein f56 is the effective focal length of the combination of the fifth lens and the sixth lens, and f is the effective focal length of the wide-angle lens assembly.

In the above wide-angle lens assembly, the wide-angle lens assembly satisfies the following condition: $10 \leq Vd_1/Nd_1 \leq 4C$, wherein Vd1 is the Abbe number of the first lens, and Nd1 is the refractive index of the first lens.

In the above wide-angle lens assembly, the wide-angle lens assembly satisfies the following condition: $10 \leq Vd_4/Nd_4 \leq 30$, wherein Vd4 is the Abbe number of the fourth lens, and Nd4 is the refractive index of the fourth lens.

In the above wide-angle lens assembly, the wide-angle lens assembly satisfies the following condition: $0 < R_{31}/R_{32} < 0.8$, wherein R31 is the curvature radius of an object-side surface of the third lens, and R32 is the curvature radius of an image-side surface of the third lens.

In the above wide-angle lens assembly, the wide-angle lens assembly satisfies the following condition: $-0.8 \leq R_{91}/R_{92} < 0$, wherein R91 is the curvature radius of an object-side surface of the ninth lens, and R92 is the curvature radius of an image-side surface of the ninth lens.

The above objects, features and advantages of the present disclosure will be more clearly understood from the following detailed description taken in conjunction with exemplary embodiments and the accompanying drawings.

BRIEF DESCRIPTION OF THE DRAWINGS

FIG. 5 is a schematic diagram illustrating the configuration of lenses of a wide-angle lens assembly according to the third embodiment of the present disclosure.

DETAILED DESCRIPTION OF THE INVENTION

Figure 1:
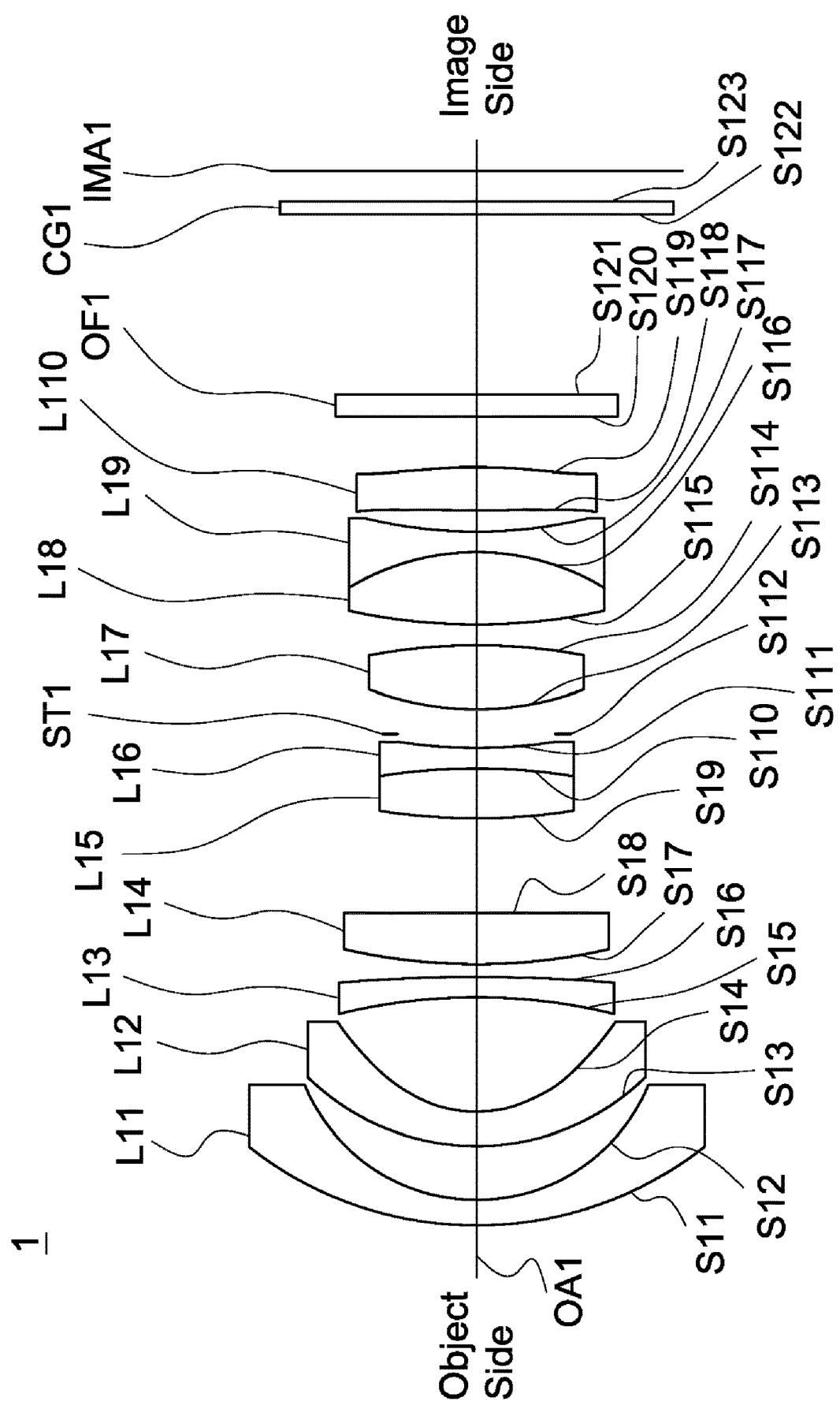
FIG. 1 is a schematic diagram illustrating the configuration of lenses of a wide-angle lens assembly according to the first embodiment of the present disclosure.

Please refer to FIG. 1. FIG. 1 is a schematic diagram illustrating the configuration of lenses of a wide-angle lens assembly according to the first embodiment of the present disclosure. The wide-angle lens assembly 1 includes, in order from an object side to an image side along an optical axis OA1, a first lens L11, a second lens L12, a third lens L13, a fourth lens L14, a fifth lens L15, a sixth lens L16, an aperture stop ST1, a seventh lens L17, an eighth lens L18, a ninth lens L19, a tenth lens L110, an optical filter OF1 and a protection glass plate CG1. In operation, the light from the object side is imaged on an imaging surface IMA1.

The first lens L11 is a meniscus lens with negative refractive power and is made of glass. The object-side surface S11 of the first lens L11 is a convex surface, and the image-side surface S12 of the first lens L11 is a concave surface. The object-side surface S11 and the image-side surface S12 are spherical surfaces.

The second lens L12 is a meniscus lens with negative refractive power and is made of plastic. The object-side surface S13 of the second lens L12 is a convex surface, and the image-side surface S14 of the second lens L12 is a concave surface. The object-side surface S13 and the image-side surface S14 are aspheric surfaces.

The third lens L13 is a meniscus lens with negative refractive power and is made of glass. The object-side surface S15 of the third lens L13 is a concave surface, and the image-side surface S16 of the third lens L13 is a convex surface. The object-side surface S15 and the image-side surface S16 are spherical surfaces.

The fourth lens L14 is a biconvex lens with positive refractive power and is made of glass. The object-side surface S17 of the fourth lens L14 is a convex surface, and the image-side surface S18 of the fourth lens L14 is a convex surface. The object-side surface S17 and the image-side surface S18 are spherical surfaces.

The fifth lens L15 is a biconvex lens with positive refractive power and is made of glass. The object-side surface S19 of the fifth lens L15 is a convex surface, and the image-side surface S110 of the fifth lens L15 is a convex surface. The object-side surface S19 and the image-side surface S110 are spherical surfaces.

The sixth lens L16 is a biconcave lens with negative refractive power and is made of glass. The object-side surface S110 of the sixth lens L16 is a concave surface, and the image-side surface S111 of the sixth lens L16 is a concave surface. The object-side surface S110 and the image-side surface S111 are spherical surfaces.

The fifth lens L15 and the sixth lens L16 together form a doublet lens.

The seventh lens L17 is a biconvex lens with positive refractive power and is made of glass. The object-side surface S113 of the seventh lens L17 is a convex surface, and the image-side surface S114 is a convex surface. The object-side surface S113 and the image-side surface S114 are spherical surfaces.

The eighth lens L18 is a biconvex lens with positive refractive power and is made of glass. The object-side surface S115 of the eighth lens L18 is a convex surface, and the image-side surface S116 of the eighth lens L18 is a convex surface. The object-side surface S115 and the image-side surface S116 are spherical surfaces.

The ninth lens L19 is a biconcave lens with negative refractive power and is made of glass. The object-side surface S116 of the ninth lens L19 is a concave surface, and the image-side surface S117 of the ninth lens L19 is a concave surface. The object-side surface S116 and the image-side surface S117 are spherical surfaces.

The eighth lens L18 and the ninth lens L19 together form a doublet lens.

The tenth lens L110 is a biconvex lens with positive refractive power and is made of plastic. The object-side surface S118 of the tenth lens L110 is a convex surface, and the image-side surface S119 of the tenth lens L110 is a convex surface. The object-side surface S118 and the image-side surface S119 are aspheric surfaces.

The object-side surface S120 and the image-side surface S121 of the optical filter OF1 are plane surfaces.

The object-side surface S122 and the image-side surface S123 of the protection glass plate CG1 are plane surfaces.

Moreover, the wide-angle lens assembly 1 in the first embodiment satisfies one of the following seven conditions:

$$-20 \leq fl_3/fl \leq -2 \quad (1)$$

$$-10 \leq fl_6/fl \leq 2C \quad (2)$$

$$2 \leq fl_{56}/fl \leq 3C \quad (3)$$

$$10 \leq Vd1_1/Nd1_1 \leq 40 \quad (4)$$

$$10 \leq Vd1_4/Nd1_4 \leq 30 \quad (5)$$

$$0 < R1_{31}/R1_{32} \leq 0.8 \qquad (6)$$

$$-0.8 \leq R1_{91}/R1_{92} < 0 \qquad (7)$$

wherein f13 is the focal length of the third lens L13, $fl_6$ is the focal length of the sixth lens L16, $fl_{56}$ is the effective focal length of the combination of the fifth lens L15 and the sixth lens L16, f1 is the effective focal length of the wide-angle lens assembly 1, $Vd1_1$ is the Abbe number of the first lens L11, $Nd1_1$ is the refractive index of the first lens L11, $Vd1_4$ is the Abbe number of the fourth lens L14, $Nd1_4$ is the refractive index of the fourth lens L14, $R1_{31}$ is the curvature radius of the object-side surface S15 of the third lens L13, $R1_{32}$ is the curvature radius of the image-side surface S16 of the third lens L13, $R1_{91}$ is the curvature radius of the object-side surface S116 of the ninth lens L19, and $R1_{92}$ is the curvature radius of the image-side surface S117 of the ninth lens L19.

Because of the disposition of the above lenses and the aperture stop ST1 and satisfying one of the conditions (1) to (7), the wide-angle lens assembly 1 may have a minimized total length, a wider view angle, a higher brightness and minimized distortion and achieve the effective correction of aberration.

Table 1 illustrates the respective parameters of the respective lenses of the wide-angle lens assembly 1 shown in FIG. 1. For the wide-angle lens assembly 1 in the first embodiment, the effective focal length is 8.493 mm, the aperture value (i.e. F number) is 2.8, the total length is 41.000 mm, and the view angle is 88.439 degrees.

TABLE 1

| Surface # | Curvature radius (mm) | Thickness (mm) | Refractive index Nd | Abbe No. Vd | Note |
|---|---|---|---|---|---|
| S11 | 14.324 | 0.982 | 1.688 | 50.1 | First lens L11 |
| S12 | 7.212 | 2.096 | | | |
| S13 | 9.000 | 1.339 | 1.535 | 55.7 | Second lens L12 |
| S14 | 4.905 | 4.441 | | | |
| S15 | −22.881 | 0.800 | 1.487 | 70.4 | Third lens L13 |
| S16 | −64.146 | 0.500 | | | |
| S17 | 22.763 | 1.991 | 1.753 | 29.5 | Fourth lens L14 |
| S18 | −7222.532 | 3.669 | | | |
| S19 | 23.501 | 1.953 | 1.744 | 44.9 | Fifth lens L15 |
| S110 | −23.501 | 0.800 | 1.637 | 34.7 | Sixth lens L16 |
| S111 | 19.608 | 0.544 | | | |
| S112 | ∞ | 0.955 | | | Aperture stop ST1 |
| S113 | 11.729 | 2.490 | 1.664 | 53.1 | Seventh lens L17 |
| S114 | −22.324 | 0.809 | | | |
| S115 | 23.511 | 2.813 | 1.620 | 60.3 | Eighth lens L18 |
| S116 | −9.497 | 0.800 | 1.755 | 27.6 | Ninth lens L19 |
| S117 | 18.479 | 0.844 | | | |
| S118 | 126.647 | 1.645 | 1.535 | 55.7 | Tenth lens L110 |
| S119 | −21.754 | 2.000 | | | |
| S120 | ∞ | 0.840 | 1.517 | 64.2 | Optical filter OF1 |
| S121 | ∞ | 7.000 | | | |
| S122 | ∞ | 0.500 | 1.517 | 64.2 | Protection glass plate CG1 |
| S123 | ∞ | 1.189 | | | |

The respective sag value z of the respective aspherical surface of the respective aspherical lens in Table 1 along the optical axis OA1 is expressed by the following equation:

$$z = ch^2/\{1+[1-(k+1)c^2h^2]^{1/2}\} + Ah^4 + Bh^6 + Ch^8$$

wherein:

c: the curvature of the surface;

h: the distance between the optical axis and a point on the lens surface along a direction vertical to the optical axis;

k: the conic coefficient;

A~C: the aspheric coefficients.

Table 2 illustrates the parameters of the respective aspherical surface of each lens listed in Table 2, wherein k is the conic constant, and A~G are the aspheric coefficients.

TABLE 2

| Surface # | S13 | S14 | S118 | S119 |
|---|---|---|---|---|
| k | 2.3110E−01 | −5.6174E−01 | −3.2525E+02 | 0.0000E+00 |
| A | −1.4323E−05 | 1.8971E−04 | −2.2475E−04 | 3.9989E−04 |
| B | −2.4921E−06 | −2.3359E−06 | 1.9005E−06 | 6.2943E−06 |
| C | −1.5810E−08 | −1.0542E−08 | −2.2281E−07 | −1.2174E−08 |

Table 3 illustrates the parameters for the conditions (1) to (7) and the calculation results of the conditions (1) to (7). From Table 3, the wide-angle lens assembly 1 in the first embodiment can satisfy the conditions (1) to (7).

TABLE 3

| | | | | | |
|---|---|---|---|---|---|
| $fl_3$ | −73.2593 mm | $fl_6$ | −16.5907 mm | $fl_{56}$ | 189.54000 mm |
| f1 | 8.493 mm | $Vd1_1$ | 50.1 | $Nd1_1$ | 1.688 |
| $Vd1_4$ | 29.5 | $Nd1_4$ | 1.753 | $R1_{31}$ | −22.8814 mm |
| $R1_{32}$ | −64.1459 mm | $R1_{91}$ | −9.4970 mm | $R1_{92}$ | 18.4795 mm |
| $fl_3/f1$ | −8.626 | $fl_6/f1$ | −1.953 | $fl_{56}/f1$ | 22.317 |
| $Vd1_1/Nd1_1$ | 29.680 | $Vd1_4/Nd1_4$ | 16.828 | $R1_{31}/R1_{32}$ | 0.357 |
| $R1_{91}/R1_{92}$ | −0.514 | | | | |

In this case, since sufficiently-strong refractive power may hardly be provided if the calculation result of f1$_3$/f1 in the condition (1) is larger than −2, it would be better that the calculation result of f1$_3$/f1 is substantially equal to or smaller than −2. Therefore, the wide-angle lens assembly 1 possibly provides sufficiently-strong refractive power when satisfying the condition −20≤f1$_3$/f1 ≤−2 '.

Figure 2A:
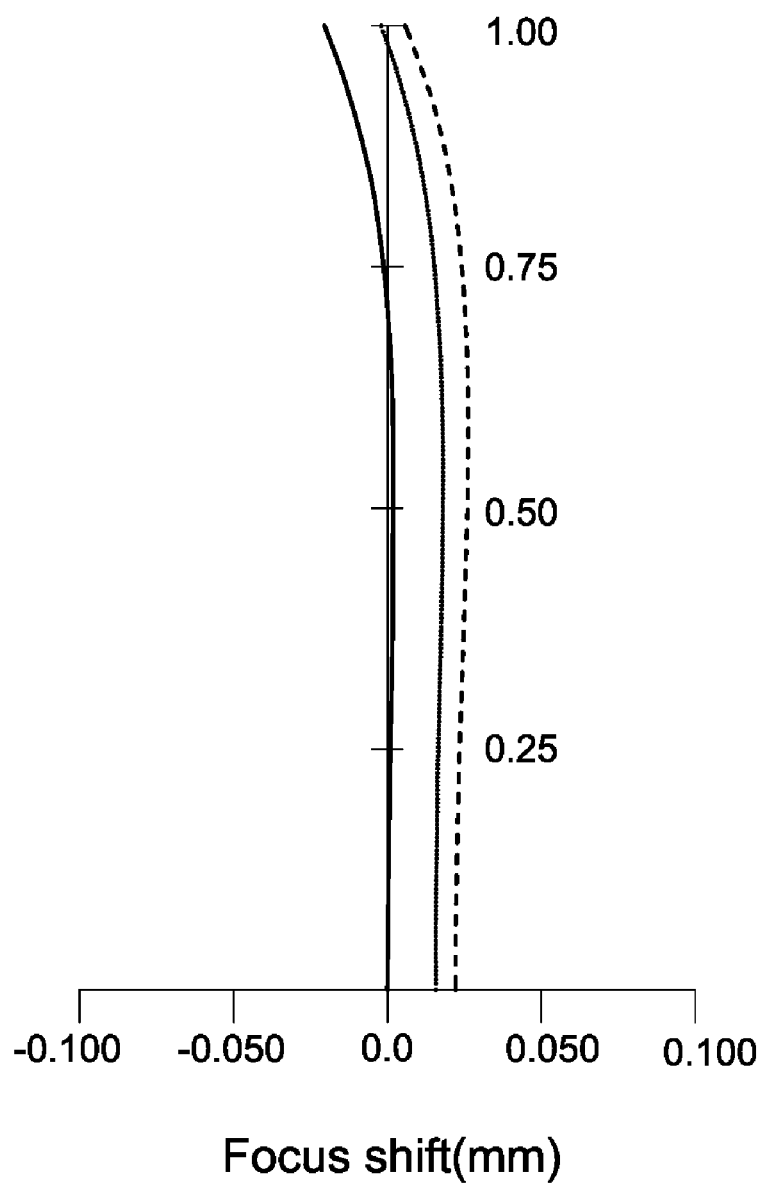
FIG. 2A is a schematic diagram illustrating the longitudinal spherical aberration of the wide-angle lens assembly in FIG. 1.
Figure 2B:
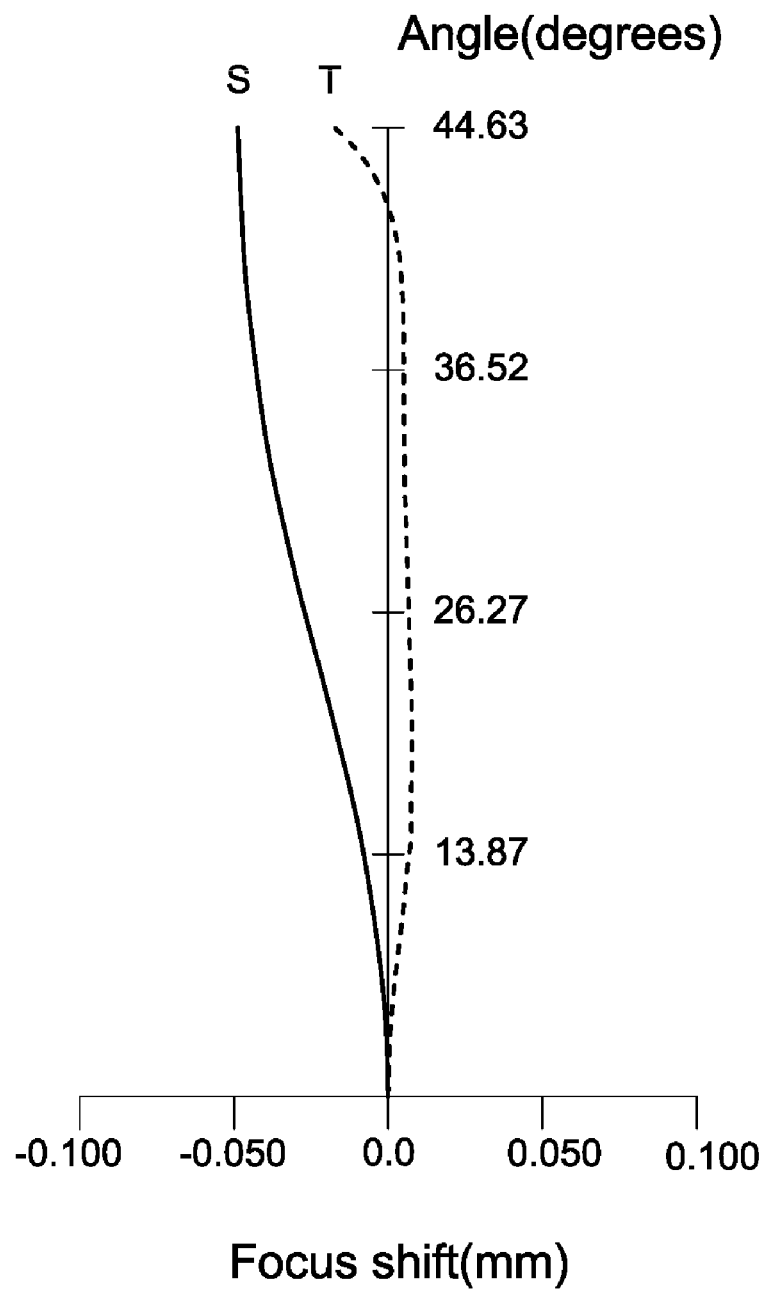
FIG. 2B is a schematic diagram illustrating the astigmatic field curvature of the wide-angle lens assembly in FIG. 1.
Figure 2C:
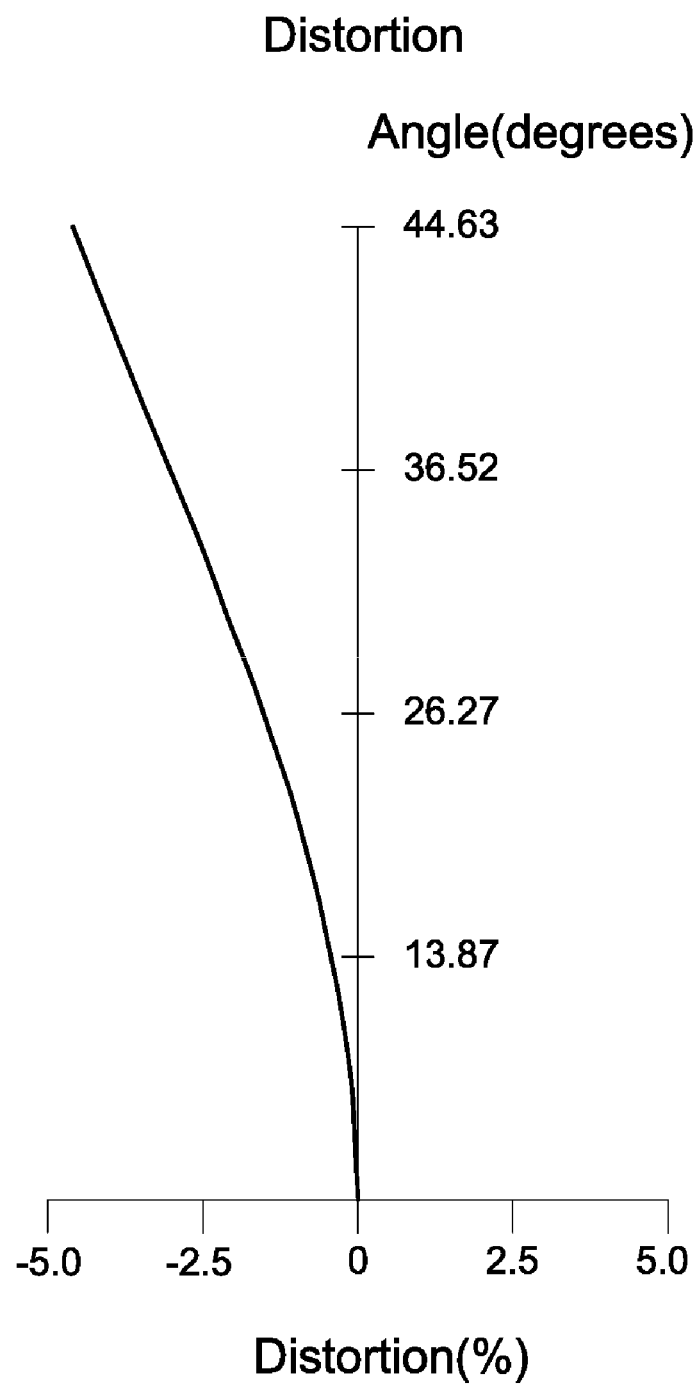
FIG. 2C is a schematic diagram illustrating the distortion of the wide-angle lens assembly in FIG. 1.

Furthermore, the wide-angle lens assembly 1 in the first embodiment can achieve the required optical performance in view of FIG. 2A to FIG. 2C. FIG. 2A is a schematic diagram illustrating the longitudinal spherical aberration of the wide-angle lens assembly 1 in the first embodiment. FIG. 2B is a schematic diagram illustrating the astigmatic field curvature of the wide-angle lens assembly 1 in the first embodiment. FIG. 2C is a schematic diagram illustrating the distortion of the wide-angle lens assembly 1 in the first embodiment.

As shown in FIG. 2A, the longitudinal spherical aberration amount of the wide-angle lens assembly 1 in the first embodiment ranges from −0.025 mm to 0.025 mm for the reference wavelengths of 455.0000 nm, 558.0000 nm and 661.0000 nm.

As shown in FIG. 2B, the astigmatic field curvature amount of the wide-angle lens assembly 1in the first embodiment in the tangential direction and the sagittal direction ranges from −0.050 mm to 0.025 mm for the reference wavelength of 558.0000 nm.

As shown in FIG. 2C, the distortion amount of the wide-angle lens assembly 1 in the first embodiment ranges from −5% to 0% for the reference wavelength of 558.0000 nm.

It may be appreciate that the longitudinal spherical aberration, the astigmatic field curvature and the distortion in the wide-angle lens assembly 1 in the first embodiment can be effectively corrected to achieve better optical performance.

Figure 3:
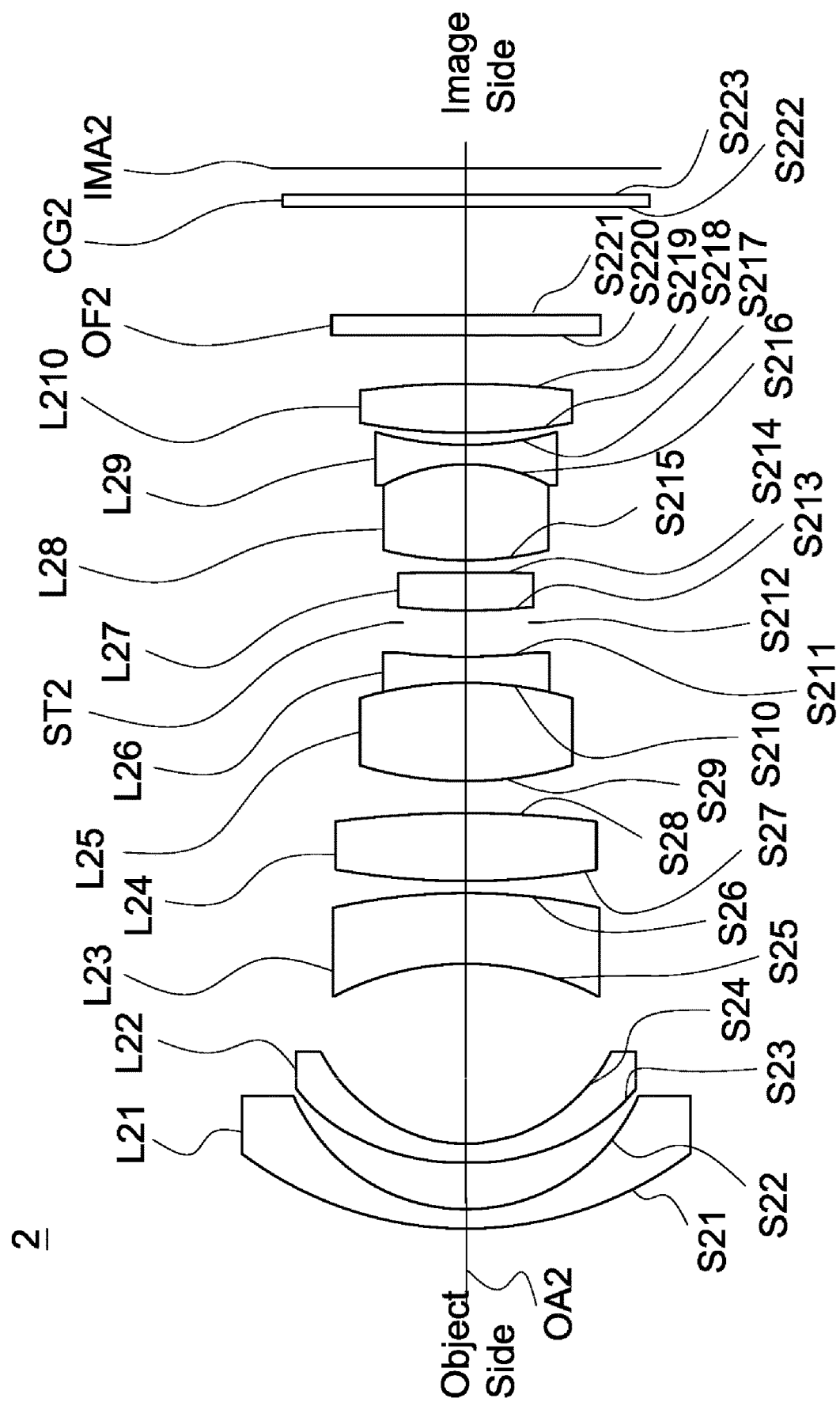
FIG. 3 is a schematic diagram illustrating the configuration of lenses of a wide-angle lens assembly according to the second embodiment of the present disclosure.

Please refer to FIG. 3. FIG. 3 is a schematic diagram illustrating the configuration of lenses of a wide-angle lens assembly according to the second embodiment of the present disclosure. The wide-angle lens assembly 2 includes, in order from an object side to an image side along an optical axis OA2, a first lens L21, a second lens L22, a third lens L23, a fourth lens L24, a fifth lens L25, a sixth lens L26, an aperture stop ST2, a seventh lens L27, an eighth lens L28, a ninth lens L29, a tenth lens L210, an optical filter OF2 and a protection glass plate CG2. In operation, the light from the object side is imaged on an imaging surface IMA2.

The first lens L21 is a meniscus lens with negative refractive power and is made of glass. The object-side surface S21 of the first lens L21 is a convex surface, and the image-side surface S22 of the first lens L21 is a concave surface. The object-side surface S21 and the image-side surface S22 are spherical surfaces.

The second lens L22 is a meniscus lens with negative refractive power and is made of plastic. The object-side surface S23 of the second lens L22 is a convex surface, and the image-side surface S24 is a concave surface. The object-side surface S23 and the image-side surface S24 are aspheric surfaces.

The third lens L23 is a meniscus lens with negative refractive power and is made of glass. The object-side surface S25 of the third lens L23 is a concave surface, and the image-side surface S26 is a convex surface. The object-side surface S25 and the image-side surface S26 are spherical surfaces.

The fourth lens L24 is a biconvex lens with positive refractive power and is made of glass. The object-side surface S27 of the fourth lens L24 is a convex surface, and the image-side surface S28 is a convex surface. The object-side surface S27 and the image-side surface S28 are spherical surfaces.

The fifth lens L25 is a biconvex lens with positive refractive power and is made of glass. The object-side surface S29 of the fifth lens L25 is a convex surface, and the image-side surface S210 of the fifth lens L25 is a convex surface. The object-side surface S29 and the image-side surface S210 are spherical surfaces.

The sixth lens L26 is a biconcave lens with negative refractive power and is made of glass. The object-side surface S210 of the sixth lens L26 is a concave surface, and the image-side surface S211 is a concave surface. The object-side surface S210 and the image-side surface S211 are spherical surfaces.

The fifth lens L25 and the sixth lens L26 together form a doublet lens.

The seventh lens L27 is a biconvex lens with positive refractive power and is made of glass. The object-side surface S213 of the seventh lens L27 is a convex surface, and the image-side surface S214 of the seventh lens L27 is a convex surface. The object-side surface S213 and the image-side surface S214 are spherical surfaces.

The eighth lens L28 is a biconvex lens with positive refractive power and is made of glass. The object-side surface S215 of the eighth lens L28 is a convex surface, and the image-side surface S216 of the eighth lens L28 is a convex surface. The object-side surface S215 and the image-side surface S216 are spherical surfaces.

The ninth lens L29 is a biconcave lens with negative refractive power and is made of glass. The object-side surface S216 of the ninth lens L29 is a concave surface, and the image-side surface S217 of the ninth lens L29 is a concave surface. The object-side surface S216 and the image-side surface S217 are spherical surfaces.

The eighth lens L28 and the ninth lens L29 together form a doublet lens.

The tenth lens L210 is a biconvex lens with positive refractive power and is made of plastic. The object-side surface S218 of the tenth lens L210 is a convex surface, and the image-side surface S219 of the tenth lens L210 is a convex surface. The object-side surface S218 and the image-side surface S219 are aspheric surfaces.

The object-side surface S220 and the image-side surface S221 of the optical filter OF2 are plane surfaces.

The object-side surface S222 and the image-side surface S223 of the protection glass plate CG2 are plane surfaces.

Moreover, the wide-angle lens assembly 2 in the second embodiment satisfies one of the following seven conditions:

$$-20 \leq f2_3/f2 \leq -2 \tag{8}$$

$$-10 \leq f2_6/f2 \leq 20 \tag{9}$$

$$2 \leq f2_{56}/f2 \leq 30 \tag{10}$$

$$10 \leq Vd2_1/Nd2_1 \leq 40 \quad (11)$$

$$10 \leq Vd2_4/Nd2_4 \leq 30 \quad (12)$$

$$0 < R2_{31}/R2_{32} \leq 0.8 \quad (13)$$

$$-0.8 \leq R2_{91}/R2_{92} < 0 \quad (14)$$

The definitions of $f2_3$, $f2_6$, $f2_{56}$, $f2$, $Vd2_1$, $Nd2_1$, $Vd2_4$, $Nd2_4$, $R2_{31}$, $R2_{32}$, $R2_{91}$ and $R2_{92}$ are respectively the same as those of $f1_3$, $f1_6$, $f1_{56}$, $f1$, $Vd1_1$, $Nd1_1$, $Vd1_4$, $Nd1_4$, $R1_{31}$, $R1_{32}$, $R1_{91}$ and $R1_{92}$ in the first embodiment, and thus, the related descriptions will be omitted hereafter.

Because of the disposition of the above lenses and the aperture stop ST2 and satisfying one of the conditions (8) to (14), the wide-angle lens assembly 2 may have a minimized total length, a wider view angle, a higher brightness and minimized distortion and achieve the effective correction of aberration.

Table 4 illustrates the respective parameters of the respective lenses of the wide-angle lens assembly 2 shown in FIG. 3. For the wide-angle lens assembly 2 in the second embodiment, the effective focal length is 8.472 mm, the aperture value is 2.8, the total length is 44.000 mm, and the view angle is 88.571 degrees.

TABLE 4

| Surface # | Curvature radius (mm) | Thickness (mm) | Refractive index Nd | Abbe No. Vd | Note |
|---|---|---|---|---|---|
| S21 | 15.251 | 0.800 | 1.680 | 31.4 | First lens L21 |
| S22 | 7.710 | 1.929 | | | |
| S23 | 10.647 | 0.800 | 1.535 | 55.7 | Second lens L22 |
| S24 | 6.204 | 7.466 | | | |
| S25 | −11.582 | 2.934 | 1.487 | 70.4 | Third lens L23 |

TABLE 4-continued

| Surface # | Curvature radius (mm) | Thickness (mm) | Refractive index Nd | Abbe No. Vd | Note |
|---|---|---|---|---|---|
| S26 | −24.733 | 0.500 | | | |
| S27 | 30.698 | 2.817 | 1.744 | 44.9 | Fourth lens L24 |
| S28 | −42.400 | 1.332 | | | |
| S29 | 14.920 | 4.089 | 1.744 | 44.9 | Fifth lens L25 |
| S210 | −14.920 | 1.072 | 1.619 | 36.5 | Sixth lens L26 |
| S211 | 22.998 | 1.417 | | | |
| S212 | ∞ | 0.500 | | | Aperture stop ST2 |
| S213 | 26.457 | 1.589 | 1.616 | 60.6 | Seventh lens L27 |
| S214 | −89.929 | 0.500 | | | |
| S215 | 13.823 | 3.989 | 1.557 | 64.1 | Eighth lens L28 |
| S216 | −7.053 | 0.800 | 1.755 | 27.6 | Ninth lens L29 |
| S217 | 13.360 | 0.500 | | | |
| S218 | 18.824 | 2.046 | 1.535 | 55.7 | Tenth lens L210 |
| S219 | −27.161 | 2.000 | | | |
| S220 | ∞ | 0.840 | 1.517 | 64.2 | Optical filter OF2 |
| S221 | ∞ | 4.500 | | | |
| S222 | ∞ | 0.500 | 1.517 | 64.2 | Protection glass plate CG2 |
| S223 | ∞ | 1.080 | | | |

The respective sag value z of the respective aspherical surface of the respective aspherical lens in Table 4 along the optical axis OA2 is expressed by the following equation:

$$z = ch2/\{1+[1-(k+1)c2h2]^{1/2}\} + Ah4 + Bh6 + Ch8$$

wherein:

c: the curvature of the surface;

h: the distance between the optical axis and a point on the lens surface along a direction vertical to the optical axis;

k: the conic coefficient;

A~C: the aspheric coefficients.

Table 5 illustrates the parameters of the respective aspherical surface of each lens listed in Table 4, wherein k is the conic constant, and A~G are the aspheric coefficients.

TABLE 5

| Surface # | S23 | S24 | S218 | S219 |
|---|---|---|---|---|
| k | 8.0072E−01 | −2.0624E−01 | −1.0496E+01 | 0.0000E+00 |
| A | 3.4056E−06 | 4.0646E−05 | −1.1143E−04 | 1.1815E−04 |
| B | −8.8957E−07 | −2.2767E−06 | 3.9330E−06 | 3.8633E−05 |
| C | 1.0823E−08 | 2.4602E−07 | −1.8848E−07 | −7.9393E−07 |

Table 6 illustrates the parameters for the conditions (8) to (14) and the calculation results of the conditions (8) to (14). From Table 6, the wide-angle lens assembly 2 in the second embodiment can satisfy the conditions (8) to (14).

TABLE 6

| | | | | | |
|---|---|---|---|---|---|
| $f2_3$ | −48.1028 mm | $f2_6$ | −14.3963 mm | $f2_{56}$ | 28.91150 mm |
| $f2$ | 8.472 mm | $Vd2_1$ | 31.4 | $Nd2_1$ | 1.680 |
| $Vd2_4$ | 44.9 | $Nd2_4$ | 1.744 | $R2_{31}$ | −11.5822 mm |
| $R2_{32}$ | −24.7326 mm | $R2_{91}$ | −7.0534 mm | $R2_{92}$ | 13.3604 mm |
| $f2_3/f2$ | −5.678 | $f2_6/f2$ | −1.699 | $f2_{56}/f2$ | 3.413 |
| $Vd2_1/Nd2_1$ | 18.690 | $Vd2_4/Nd2_4$ | 25.745 | $R2_{31}/R2_{32}$ | 0.468 |
| $R2_{91}/R2_{92}$ | −0.528 | | | | |

In this case, since sufficiently-strong refractive power may hardly be provided if the calculation result of $f2_6/f2$ 的 in the condition (9) is larger than 20, it would be better that the calculation result of $f2_6/f2$ is substantially equal to or smaller than 20. Therefore, the wide-angle lens assembly 2 may provide sufficiently-strong refractive power when satisfying $-10 \leq f2_6/f2 \leq 2C$.

Figure 4A:
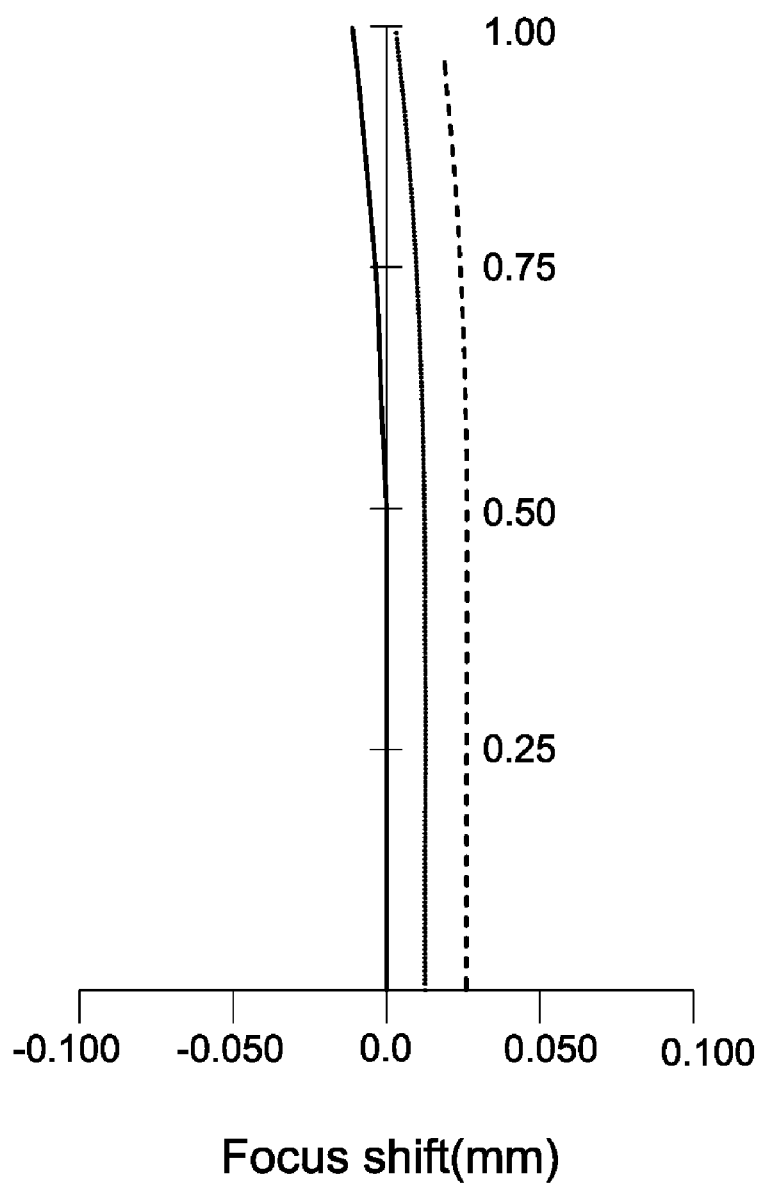
FIG. 4A is a schematic diagram illustrating the longitudinal spherical aberration of the wide-angle lens assembly in FIG. 3.
Figure 4B:
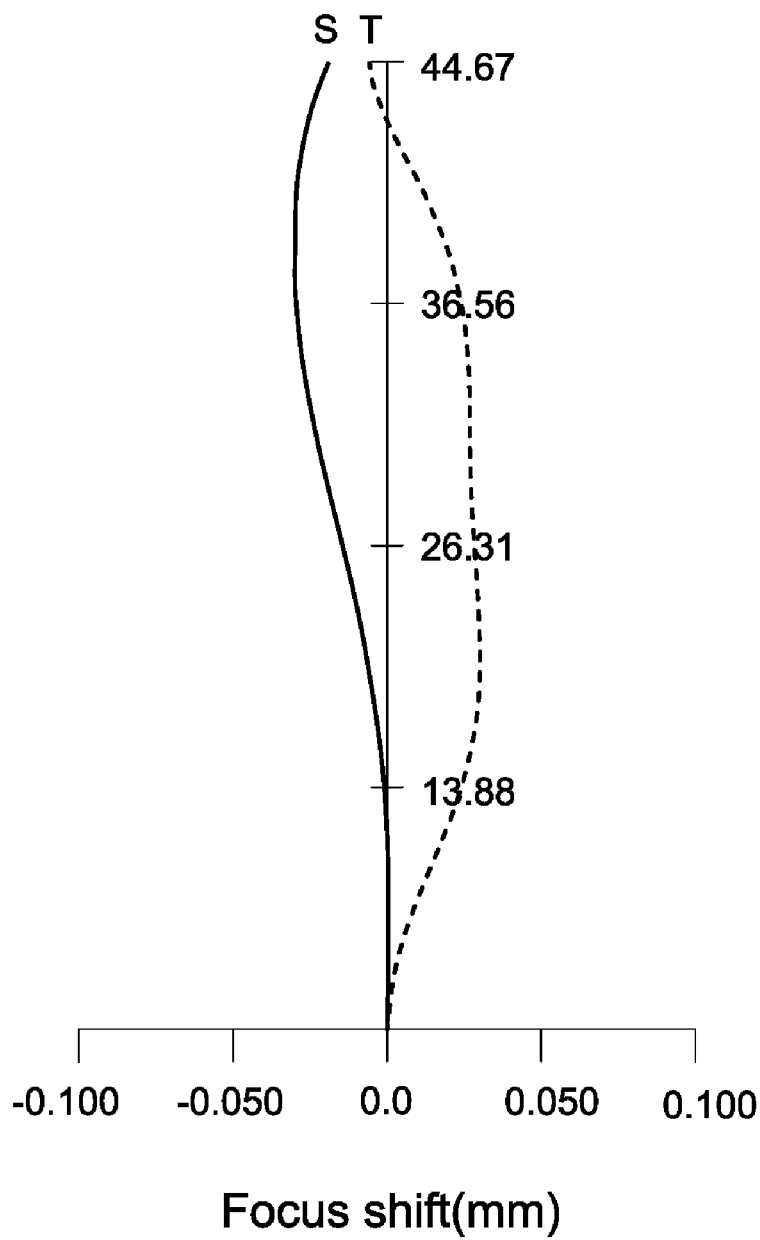
FIG. 4B is a schematic diagram illustrating the astigmatic field curvature of the wide-angle lens assembly in FIG. 3.
Figure 4C:
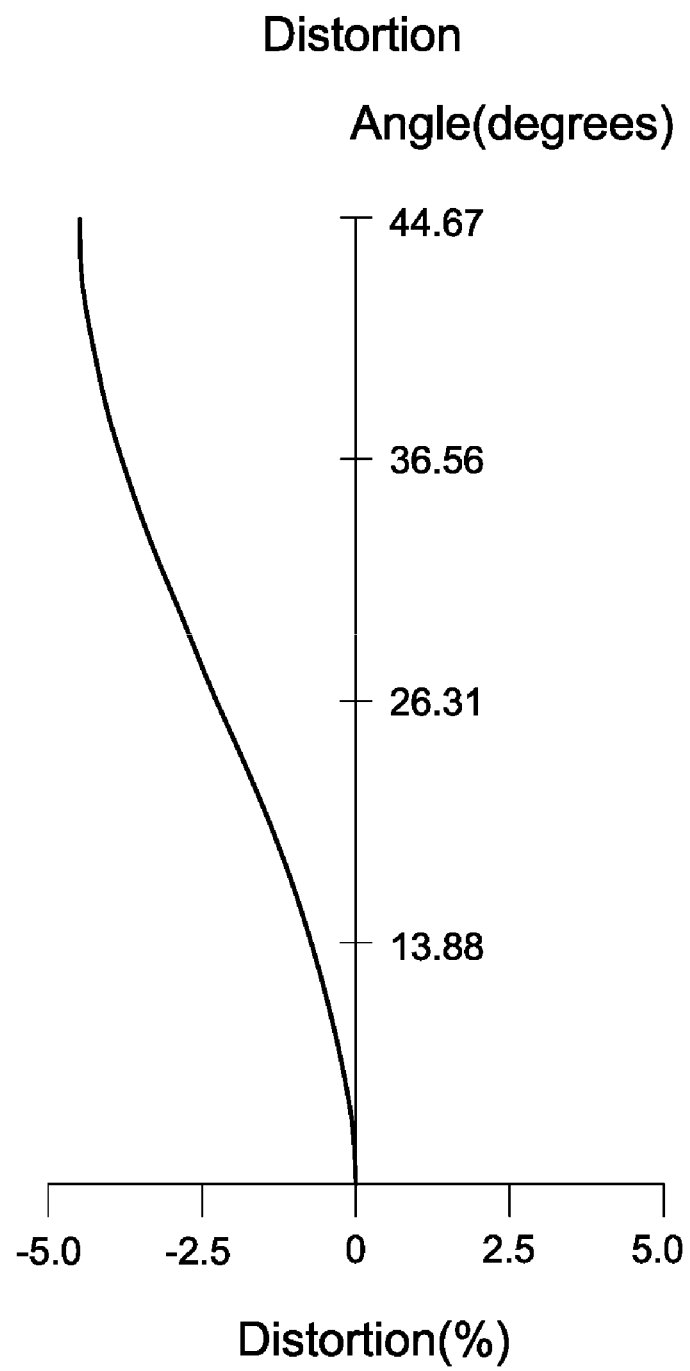
FIG. 4C is a schematic diagram illustrating the distortion of the wide-angle lens assembly in FIG. 3.

Moreover, the wide-angle lens assembly 2 in the second embodiment can achieve the required optical performance in view of FIG. 4A to FIG. 4C. FIG. 4A is a schematic diagram illustrating the longitudinal spherical aberration of the wide-angle lens assembly 2 in the second embodiment. FIG. 4B is a schematic diagram illustrating the astigmatic field curvature of the wide-angle lens assembly 2 in the second embodiment. FIG. 4C is a schematic diagram illustrating the distortion of the wide-angle lens assembly 2 in the second embodiment.

As shown in FIG. 4A, the longitudinal spherical aberration amount of the wide-angle lens assembly 2 in the second embodiment ranges from −0.025 mm to 0.025 mm for the reference wavelengths of 455.0000 nm, 558.0000 nm and 661.0000 nm.

As shown in FIG. 4B, the astigmatic field curvature amount of the wide-angle lens assembly 2 in the second embodiment in the tangential direction and the sagittal direction ranges −0.050 mm to 0.050 mm for the reference wavelength of 558.0000 nm.

As shown in FIG. 4C, the distortion amount of the wide-angle lens assembly 2 in the second embodiment ranges from −5% to 0% for the reference wavelength of 558.0000 nm.

It may be appreciate that the longitudinal spherical aberration, the astigmatic field curvature and the distortion in the wide-angle lens assembly 2 in the second embodiment can be effectively corrected to achieve better optical performance.

Please refer to FIG. 5. FIG. 5 is a schematic diagram illustrating the configuration of lenses of a wide-angle lens assembly according to the third embodiment of the present disclosure. The wide-angle lens assembly 3 includes, in order from an object side to an image side along an optical axis OA3, a first lens L31, a second lens L32, a third lens L33, a fourth lens L34, a fifth lens L35, a sixth lens L36, an aperture stop ST3, a seventh lens L37, an eighth lens L38, a ninth lens L39, a tenth lens L310, an optical filter OF3 and a protection glass plate CG3. In operation, the light from the object side is imaged on an imaging surface IMA3.

The first lens L31 is a meniscus lens with negative refractive power and is made of glass. The object-side surface S31 of the first lens L31 is a convex surface, and the image-side surface S32 of the first lens L31 is a concave surface. The object-side surface S31 and the image-side surface S32 are spherical surfaces.

The second lens L32 is a meniscus lens with negative refractive power and is made of plastic. The object-side surface S33 of the second lens L32 is a convex surface, and the image-side surface S34 of the second lens L32 is a concave surface. The object-side surface S33 and the image-side surface S34 are aspheric surfaces.

The third lens L33 is a meniscus lens with negative refractive power and is made of glass. The object-side surface S35 of the third lens L33 is a concave surface, and the image-side surface S36 of the third lens L33 is a convex surface. The object-side surface S35 and the image-side surface S36 are spherical surfaces.

The fourth lens L34 is a biconvex lens with positive refractive power and is made of glass. The object-side surface S37 of the fourth lens L34 is a convex surface, and the image-side surface S38 of the fourth lens L34 is a convex surface. The object-side surface S37 and the image-side surface S38 are spherical surfaces.

The fifth lens L35 is a biconvex lens with positive refractive power and is made of glass. The object-side surface S39 of the fifth lens L35 is a convex surface, and the image-side surface S310 of the fifth lens L35 is a convex surface. The object-side surface S39 and the image-side surface S310 are spherical surfaces.

The sixth lens L36 is a meniscus lens with negative refractive power and is made of glass. The object-side surface S310 of the sixth lens L36 is a concave surface, and the image-side surface S311 of the sixth lens L36 is a convex surface. The object-side surface S310 and the image-side surface S311 are spherical surfaces.

The fifth lens L35 and the sixth lens L36 together form a doublet lens.

The seventh lens L37 is a biconvex lens with positive refractive power and is made of glass. The object-side surface S313 of the seventh lens L37 is a convex surface, and the image-side surface S314 of the seventh lens L37 is a convex surface. The object-side surface S313 and the image-side surface S314 are spherical surfaces.

The eighth lens L38 is a biconvex lens with positive refractive power and is made of glass. The object-side surface S315 of the eighth lens L38 is a convex surface, and the image-side surface S316 of the eighth lens L38 is a convex surface. The object-side surface S315 and the image-side surface S316 are spherical surfaces.

The ninth lens L39 is a biconcave lens with negative refractive power and is made of glass. The object-side surface S316 of the ninth lens L39 is a concave surface, and the image-side surface S317 of the ninth lens L39 is a concave surface. The object-side surface S316 and the image-side surface S317 are spherical surfaces.

The eighth lens L38 and the ninth lens L39 together form a doublet lens.

The tenth lens L310 is a biconvex lens with positive refractive power and is made of plastic. The object-side surface S318 of the tenth lens L310 is a convex surface, and the image-side surface S319 of the tenth lens L310 is a convex surface. The object-side surface S318 and the image-side surface S319 are aspheric surfaces.

The object-side surface S320 and the image-side surface S321 of the optical filter OF3 are plane surfaces.

The object-side surface S322 and the image-side surface S323 of the protection glass plate CG3 are plane surfaces.

Moreover, the wide-angle lens assembly 3 in the third embodiment satisfies one of the following seven conditions:

$$-20 \leq f3_3/f3 \leq -2 \quad (15)$$

$$-10 \leq f3_6/f3 \leq 2C \quad (16)$$

$2 \leq f3_{56}/f3 \leq 30$ (17)

$10 \leq Vd3_1/Nd3_1 \leq 40$ (18)

$10 \leq Vd3_4/Nd3_4 \leq 30$ (19)

$0 < R3_{31}/R3_{32} \leq 0.8$ (20)

$-0.8 \leq R3_{91}/R3_{92} < 0$ (21)

The definitions of $f3_3$, $f3_6$, $f3_{56}$, $f3$, $Vd3_1$, $Nd3_1$, $Vd3_4$, $Nd3_4$, $R3_{31}$, $R3_{32}$, $R3_{91}$ and $R3_{92}$ are respectively the same as those of $f1_3$, $f1_6$, $f1_{56}$, $f1$, $Vd1_1$, $Nd1_1$, $Vd1_4$, $Nd1_4$, $R1_{31}$, $R1_{32}$, $R1_{91}$ and $R1_{92}$ in the first embodiment, and thus, the related descriptions will be omitted hereafter.

Because of the disposition of the above lenses and the aperture stop ST3 and satisfying one of the conditions (15) to (21), the wide-angle lens assembly 3 may have a minimized total length, a wider view angle, a higher brightness and minimized distortion and achieve the effective correction of aberration.

Table 7 illustrates the respective parameters of the respective lenses of the wide-angle lens assembly 3 shown in FIG. 5. For the wide-angle lens assembly 3 in the third embodiment, the effective focal length is 8.461 mm, the aperture value is 2.8, the total length is 41.000 mm, and the view angle is 88.183 degrees.

TABLE 7

| Surface # | Curvature radius (mm) | Thickness (mm) | Refractive index Nd | Abbe No. Vd | Note |
|---|---|---|---|---|---|
| S31 | 14.220 | 0.984 | 1.729 | 54.7 | First lens L31 |
| S32 | 7.437 | 1.857 | | | |
| S33 | 8.559 | 1.341 | 1.535 | 55.7 | Second lens L32 |
| S34 | 4.717 | 4.271 | | | |

TABLE 7-continued

| Surface # | Curvature radius (mm) | Thickness (mm) | Refractive index Nd | Abbe No. Vd | Note |
|---|---|---|---|---|---|
| S35 | −44.470 | 0.800 | 1.487 | 70.4 | Third lens L33 |
| S36 | −372.407 | 0.500 | | | |
| S37 | 56.885 | 1.693 | 1.755 | 27.6 | Fourth lens L34 |
| S38 | −184.991 | 4.035 | | | |
| S39 | 17.082 | 2.218 | 1.744 | 44.8 | Fifth lens L35 |
| S310 | −17.082 | 0.800 | 1.640 | 34.5 | Sixth lens L36 |
| S311 | −284.621 | 0.531 | | | |
| S312 | ∞ | 1.291 | | | Aperture stop ST3 |
| S313 | 100.000 | 1.889 | 1.678 | 55.3 | Seventh lens L37 |
| S314 | −18.468 | 0.507 | | | |
| S315 | 18.453 | 2.868 | 1.620 | 60.3 | Eighth lens L38 |
| S316 | −9.282 | 1.616 | 1.755 | 27.6 | Ninth lens L39 |
| S317 | 16.020 | 0.909 | | | |
| S318 | 76.559 | 2.032 | 1.535 | 55.7 | Tenth lens L310 |
| S319 | −19.613 | 2.000 | | | |
| S320 | ∞ | 0.840 | 1.517 | 64.2 | Optical filter OF3 |
| S321 | ∞ | 7.000 | | | |
| S322 | ∞ | 0.500 | 1.517 | 64.2 | Protection glass plate CG3 |
| S323 | ∞ | 0.519 | | | |

The respective sag value z of the respective aspherical surface of the respective aspherical lens in Table 7 along the optical axis OA3 is expressed by the following equation:

$$z = ch2/\{1+[1-(k+1)c2h2]^{1/2}\} + Ah4 + Bh6 + Ch8$$

wherein:

c: the curvature of the surface;

h: the distance between the optical axis and a point on the lens surface along a direction vertical to the optical axis;

k: the conic coefficient;

A~C: the aspheric coefficients.

Table 8 illustrates the parameters of the respective aspherical surface of each lens listed in Table 7, wherein k is the conic constant, and A~G are the aspheric coefficients.

TABLE 8

| Surface # | S33 | S34 | S318 | S319 |
|---|---|---|---|---|
| k | −3.0384E−02 | −6.1329E−01 | 0.0000E+00 | 0.0000E+00 |
| A | −5.4565E−05 | 2.0512E−04 | −9.8714E−05 | 3.6170E−04 |
| B | −3.3034E−06 | −6.2421E−06 | 4.1953E−06 | 6.1424E−06 |
| C | 1.2607E−08 | 1.8682E−07 | −1.2804E−07 | −3.5358E−08 |

Table 9 illustrates the parameters for the conditions (15) to (21) and the calculation results of the conditions (15) to (21). From Table 9, the wide-angle lens assembly 3 in the third embodiment can satisfy the conditions (15) to (21).

TABLE 9

| | | | | | | |
|---|---|---|---|---|---|---|
| $f3_3$ | −103.4321 mm | $f3_6$ | −28.3033 mm | $f3_{56}$ | 19.40330 | mm |
| $f3$ | 8.461 mm | $Vd3_1$ | 54.7 | $Nd3_1$ | 1.729 | |
| $Vd3_4$ | 27.6 | $Nd3_4$ | 1.755 | $R3_{31}$ | −44.4697 | mm |
| $R3_{32}$ | −372.4070 mm | $R3_{91}$ | −9.2817 mm | $R3_{92}$ | 16.0204 | mm |
| $f3_3/f3$ | −12.225 | $f3_6/f3$ | −3.345 | $f3_{56}/f3$ | 2.293 | |
| $Vd3_1/Nd3_1$ | 31.637 | $Vd3_4/Nd3_4$ | 15.726 | $R3_{31}/R3_{32}$ | 0.119 | |
| $R3_{91}/R3_{92}$ | −0.579 | | | | | |

In the case, since the achromatic ability may become weak if the calculation result of $Vd3_1/Nd3_1$ in the condition (18) is larger than 40, it would be better that the calculation result of $Vd3_1/Nd3_1$ is substantially equal to or smaller than 40. Therefore, the wide-angle lens assembly 3 may have the optimal achromatic ability when satisfying $10 \leq Vd3_1/Nd3_1 \leq 40$.

Figure 6A:
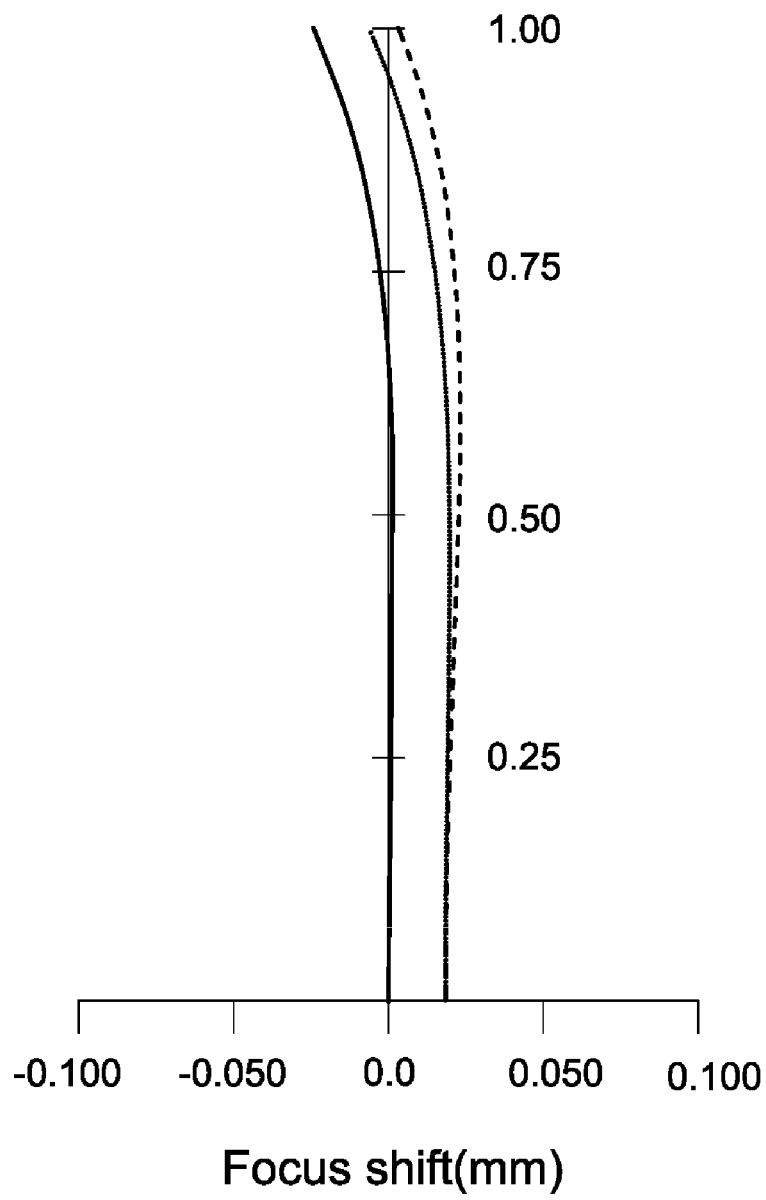
FIG. 6A is a schematic diagram illustrating the longitudinal spherical aberration of the wide-angle lens assembly in FIG. 5.
Figure 6B:
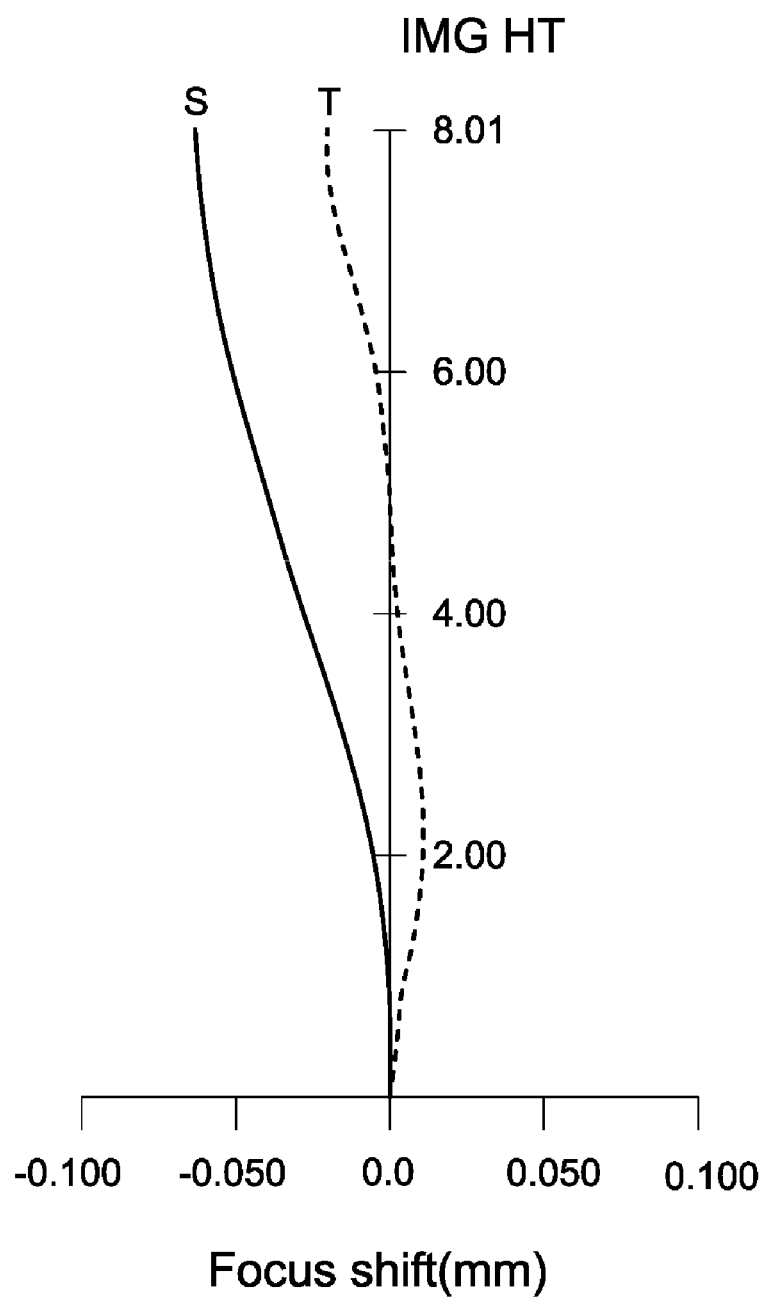
FIG. 6B is a schematic diagram illustrating the astigmatic field curvature of the wide-angle lens assembly in FIG. 5.
Figure 6C:
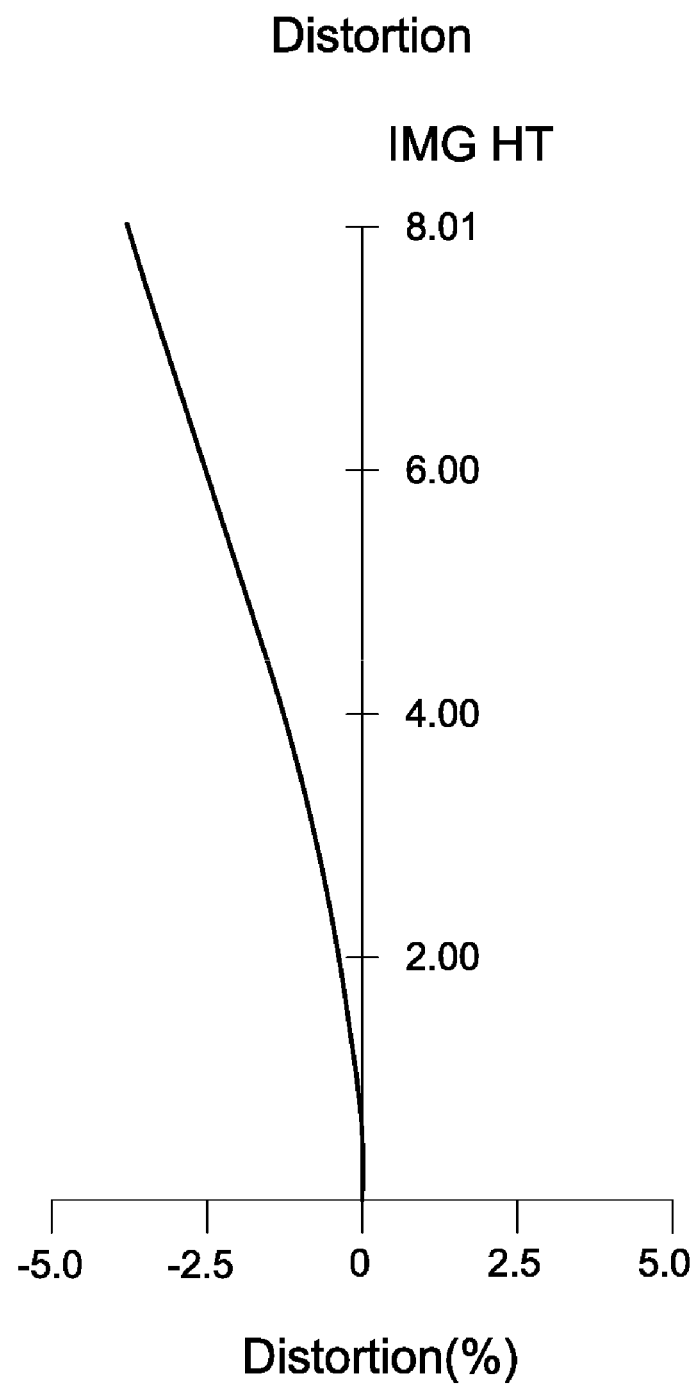
FIG. 6C is a schematic diagram illustrating the distortion of the wide-angle lens assembly in FIG. 5.

Additionally, the wide-angle lens assembly 3 in the third embodiment can achieve the required optical performance in view of FIG. 6A to FIG. 6C. FIG. 6A is a schematic diagram illustrating the longitudinal spherical aberration of the wide-angle lens assembly 3 in the third embodiment. FIG. 6B is a schematic diagram illustrating the astigmatic field curvature of the wide-angle lens assembly 3 in the third embodiment. FIG. 6C is a schematic diagram illustrating the distortion of the wide-angle lens assembly 3 in the third embodiment.

As shown in FIG. 6A, the longitudinal spherical aberration amount in the wide-angle lens assembly 3 in the third embodiment ranges from −0.025 mm to 0.025 mm for the reference wavelengths of 455.0000 nm, 558.0000 nm and 661.0000 nm.

As shown in FIG. 6B, the astigmatic field curvature amount in the wide-angle lens assembly 3 in the third embodiment in the tangential direction and the sagittal direction ranges from −0.075 mm to 0.025 mm for the 558.0000 nm reference wavelength.

As shown in FIG. 6C, the distortion amount of the wide-angle lens assembly 3 in the third embodiment ranges from −5% to 0% for the 558.0000 nm reference wavelength.

It may be appreciate that the longitudinal spherical aberration, the astigmatic field curvature and the distortion in the wide-angle lens assembly 3 in the third embodiment can be effectively corrected to achieve better optical performance.

Even though the primary conditions to be satisfied in the present disclosure are $-20 \leq f_3/f \leq -2$, $-10 \leq f_6/f \leq 20$ and $10 \leq Vd1_1/Nd_1 \leq 4C$, the above embodiments also satisfy the other conditions. Satisfying $-20 \leq f_3/f \leq -2$ and $-10 \leq f_6/f-20$ enables the wide-angle lens assembly to have sufficiently-strong refractive power, and satisfying the condition $10 \leq Vd_1/Nd_1 \leq 40$ enables the wide-angle lens assembly to have the better achromatic ability.

It should be understood that although the present disclosure has been described with reference to the above preferred embodiments, these embodiments are not intended to retrain the present disclosure. It will be apparent to one of ordinary skill in the art that various changes or modifications to the described embodiments can be made without departing from the spirit of the present disclosure. Accordingly, the scope of the present disclosure is defined by the attached claims.

What is claimed is:

1. A wide-angle lens assembly, comprising:
a first lens having negative refractive power, and the first lens comprising a convex surface facing an object side and a concave surface facing an image side;
a second lens having negative refractive power;
a third lens having refractive power, and the third lens comprising a convex surface facing the image side;
a fourth lens having positive refractive power, and the fourth lens comprising a convex surface facing the object side;
a fifth lens having refractive power;
a sixth lens having refractive power, and the sixth lens comprising a concave surface facing the object side and a convex surface facing an image side;
a seventh lens having positive refractive power;
an eighth lens having positive refractive power, and the eighth lens being a biconvex lens;
a ninth lens having negative refractive power; and
a tenth lens having refractive power, and the tenth lens comprising a convex surface facing the image side;
wherein the first lens, the second lens, the third lens, the fourth lens, the fifth lens, the sixth lens, the seventh lens, the eighth lens, the ninth lens and the tenth lens are arranged in order from the object side to the image side along an optical axis.

2. A wide-angle lens assembly, comprising:
a first lens having negative refractive power, and the first lens comprising a convex surface facing an object side and a concave surface facing an image side;
a second lens having negative refractive power;
a third lens having refractive power, and the third lens comprising a convex surface facing the image side;
a fourth lens having positive refractive power, and the fourth lens comprising a convex surface facing the object side;
a fifth lens having refractive power;
a sixth lens having refractive power, and the sixth lens comprising a concave surface facing the object side;
a seventh lens having positive refractive power;
an eighth lens having positive refractive power, and the eighth lens being a biconvex lens;
a ninth lens having negative refractive power; and
a tenth lens having refractive power, and the tenth lens comprising a convex surface facing the image side;
wherein the first lens, the second lens, the third lens, the fourth lens, the fifth lens, the sixth lens, the seventh lens, the eighth lens, the ninth lens and the tenth lens are arranged in order from the object side to the image side along an optical axis;
wherein the fifth lens and the sixth lens form a doublet lens.

3. A wide-angle lens assembly, comprising:
a first lens having negative refractive power, and the first lens comprising a convex surface facing an object side and a concave surface facing an image side;
a second lens having negative refractive power;
a third lens having refractive power, and the third lens comprising a convex surface facing the image side;
a fourth lens having positive refractive power, and the fourth lens comprising a convex surface facing the object side;
a fifth lens having refractive power;
a sixth lens having refractive power, and the sixth lens comprising a concave surface facing the object side;
a seventh lens having positive refractive power;
an eighth lens having positive refractive power, and the eighth lens being a biconvex lens;
a ninth lens having negative refractive power; and
a tenth lens having refractive power, and the tenth lens comprising a convex surface facing the image side;
wherein the first lens, the second lens, the third lens, the fourth lens, the fifth lens, the sixth lens, the seventh lens, the eighth lens, the ninth lens and the tenth lens are arranged in order from the object side to the image side along an optical axis;
wherein the wide-angle lens assembly satisfies:

$$2 \leq f_{56}/f \leq 3C;$$

wherein $f_{56}$ is an effective focal length of a combination of the fifth lens and the sixth lens, and f is an effective focal length of the wide-angle lens assembly.

4. The wide-angle lens assembly according to claim 1, wherein the sixth lens has negative refractive power.

5. The wide-angle lens assembly according to claim 2, wherein the sixth lens has negative refractive power and further comprises a convex surface facing the image side.

6. The wide-angle lens assembly according to one of claim 3, wherein the sixth lens has negative refractive power and further comprises a convex surface facing the image side.

7. The wide-angle lens assembly according to claim 1, wherein the third lens has negative refractive power, the fourth lens further comprises a convex surface facing the image side, the fifth lens is a biconvex lens with positive refractive power, the ninth lens comprises a concave surface facing the image side, and the tenth lens has positive refractive power and further comprises a convex surface facing the object side.

8. The wide-angle lens assembly according to claim 1, wherein the fifth lens and the sixth lens form a doublet lens, and the eighth lens and the ninth lens form a doublet lens.

9. The wide-angle lens assembly according to claim 2, wherein the eighth lens and the ninth lens form a doublet lens.

10. The wide-angle lens assembly according to claim 3, wherein the fifth lens and the sixth lens form a doublet lens, and the eighth lens and the ninth lens form a doublet lens.

11. The wide-angle lens assembly according to claim 7, wherein the wide-angle lens assembly satisfies:

$$2 \leq f_{56}/f \leq 3C;$$

wherein $f_{56}$ is an effective focal length of a combination of the fifth lens and the sixth lens, and f is an effective focal length of the wide-angle lens assembly.

12. The wide-angle lens assembly according to claim 1, wherein the wide-angle lens assembly satisfies:

$$-20 \leq f_3/f \leq -2 \text{ and}$$

wherein $f_3$ is a focal length of the third lens and f is an effective focal length of the wide-angle lens assembly.

13. The wide-angle lens assembly according to claim 1, wherein the wide-angle lens assembly satisfies:

$$-10 \leq f_6/f \leq 20;$$

$f_6$ is a focal length of the sixth lens and f is an effective focal length of the wide-angle lens assembly.

14. The wide-angle lens assembly according to claim 2, wherein the wide-angle lens assembly satisfies:

$$2 \leq f_{56}/f \leq 3C;$$

wherein $f_{56}$ is an effective focal length of a combination of the fifth lens and the sixth lens, and f is an effective focal length of the wide-angle lens assembly.

15. The wide-angle lens assembly according to claim 1, wherein the wide-angle lens assembly satisfies:

$$10 \leq Vd_1/Nd_1 \leq 4C;$$

wherein $Vd_1$ is an Abbe number of the first lens and $Nd_1$ is a refractive index of the first lens.

16. The wide-angle lens assembly according to one of claim 1, wherein the wide-angle lens assembly satisfies:

$$10 \leq Vd_4/Nd_4 \leq 30;$$

$Vd_4$ is an Abbe number of the fourth lens and $Nd_4$ is a refractive index of the fourth lens.

17. The wide-angle lens assembly according to claim 1, wherein the wide-angle lens assembly satisfies:

$$0 < R_{31}/R_{32} \leq 0.8;$$

wherein R31 is a curvature radius of an object-side surface of the third lens, R32 is a curvature radius of an image-side surface of the third lens.

18. The wide-angle lens assembly according to claim 1, wherein the wide-angle lens assembly satisfies:

$$-0.8 \leq R_{91}/R_{92} < 0;$$

R91 is a curvature radius of an object-side surface of the ninth lens, and R92 is a curvature radius of an image-side surface of the ninth lens.

19. The wide-angle lens assembly according to claim 2, wherein the wide-angle lens assembly satisfies:

$$0 < R_{31}/R_{32} \leq 0.8; \text{ and}$$

$$-0.8 \leq R_{91}/R_{92} < 0;$$

wherein R31 is a curvature radius of an object-side surface of the third lens, R32 is a curvature radius of an image-side surface of the third lens, R91 is a curvature radius of an object-side surface of the ninth lens, and R92 is a curvature radius of an image-side surface of the ninth lens.

20. The wide-angle lens assembly according to claim 3, wherein the wide-angle lens assembly satisfies:

$$0 < R_{31}/R_{32} \leq 0.8; \text{ and}$$

$$-0.8 \leq R_{91}/R_{92} < 0;$$

wherein R31 is a curvature radius of an object-side surface of the third lens, R32 is a curvature radius of an image-side surface of the third lens, R91 is a curvature radius of an object-side surface of the ninth lens, and R92 is a curvature radius of an image-side surface of the ninth lens.

\* \* \* \* \*